March 5, 1963
H. A. SMITH ETAL
3,079,956
SPRING JOINING MACHINE
Filed Feb. 16, 1959
8 Sheets-Sheet 8
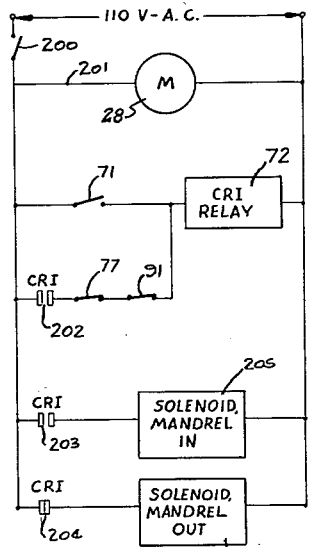
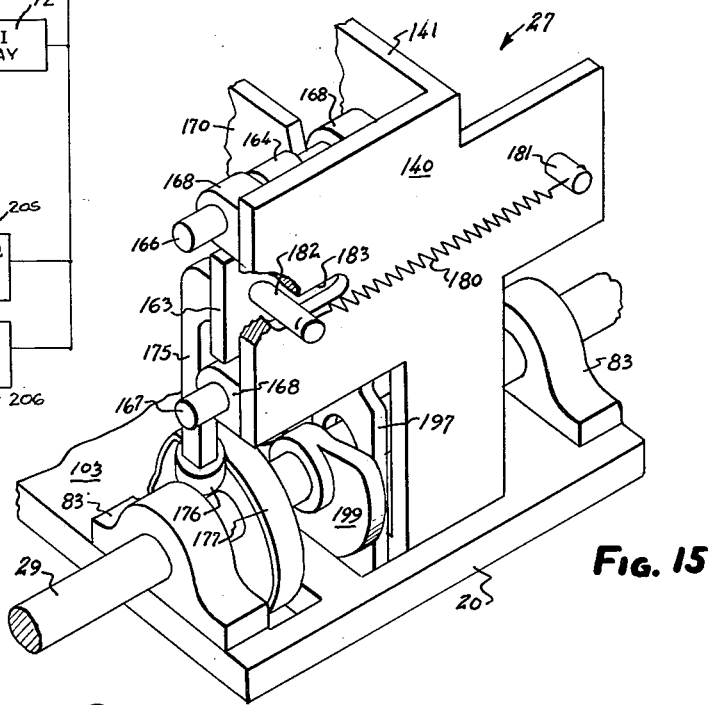
FIG. 16
FIG. 15
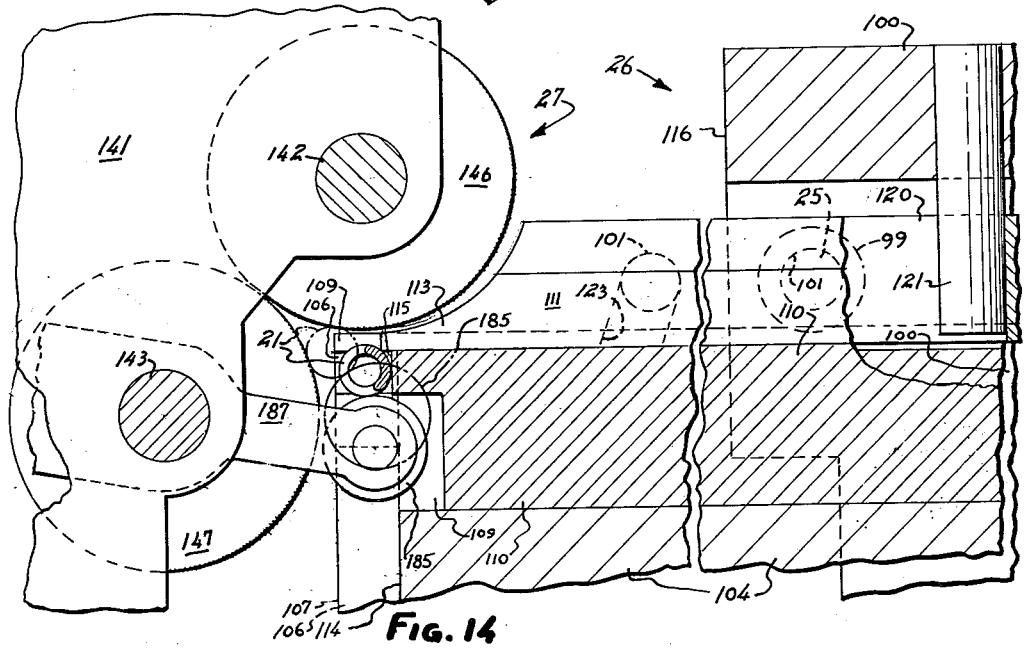
FIG. 14

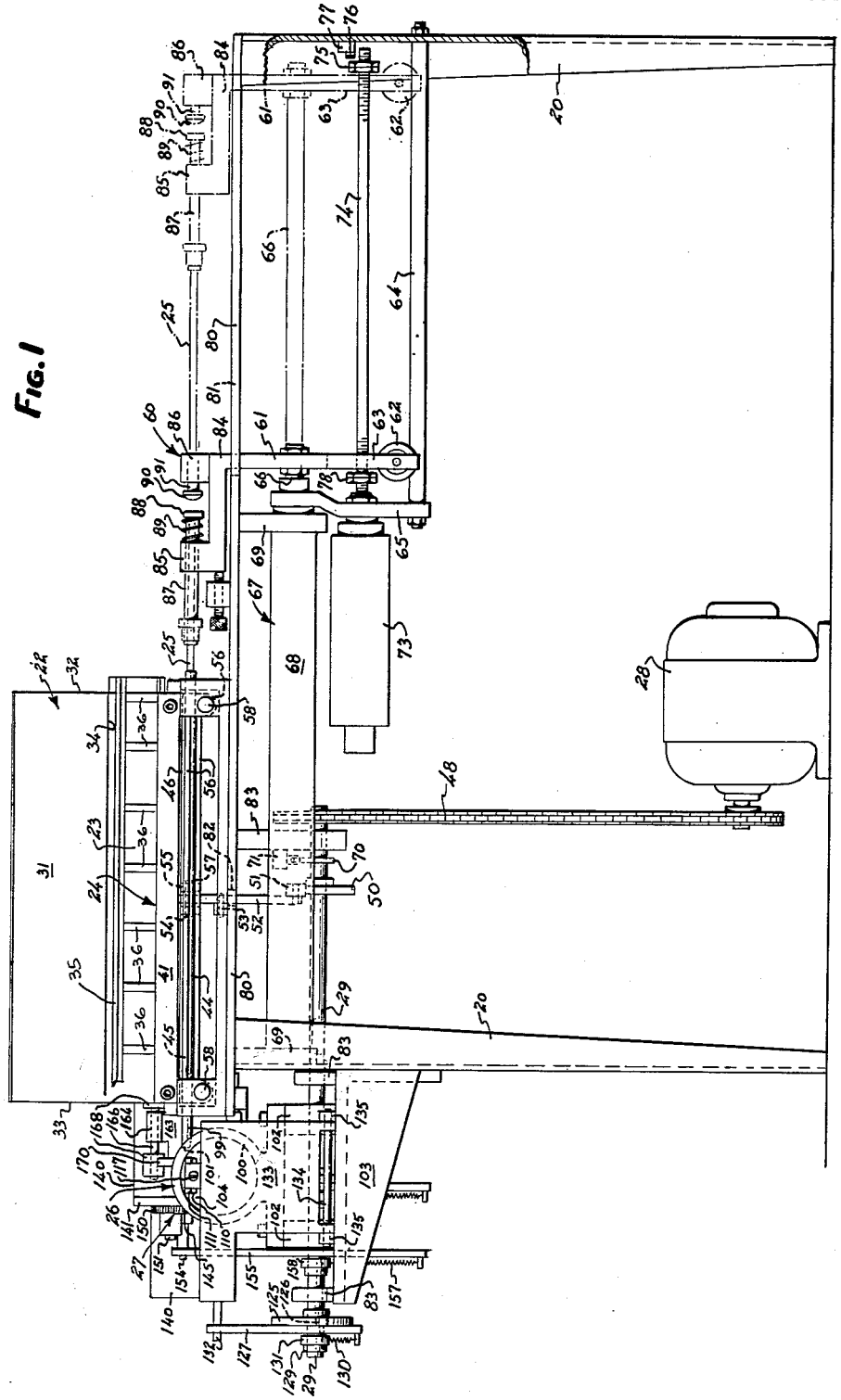

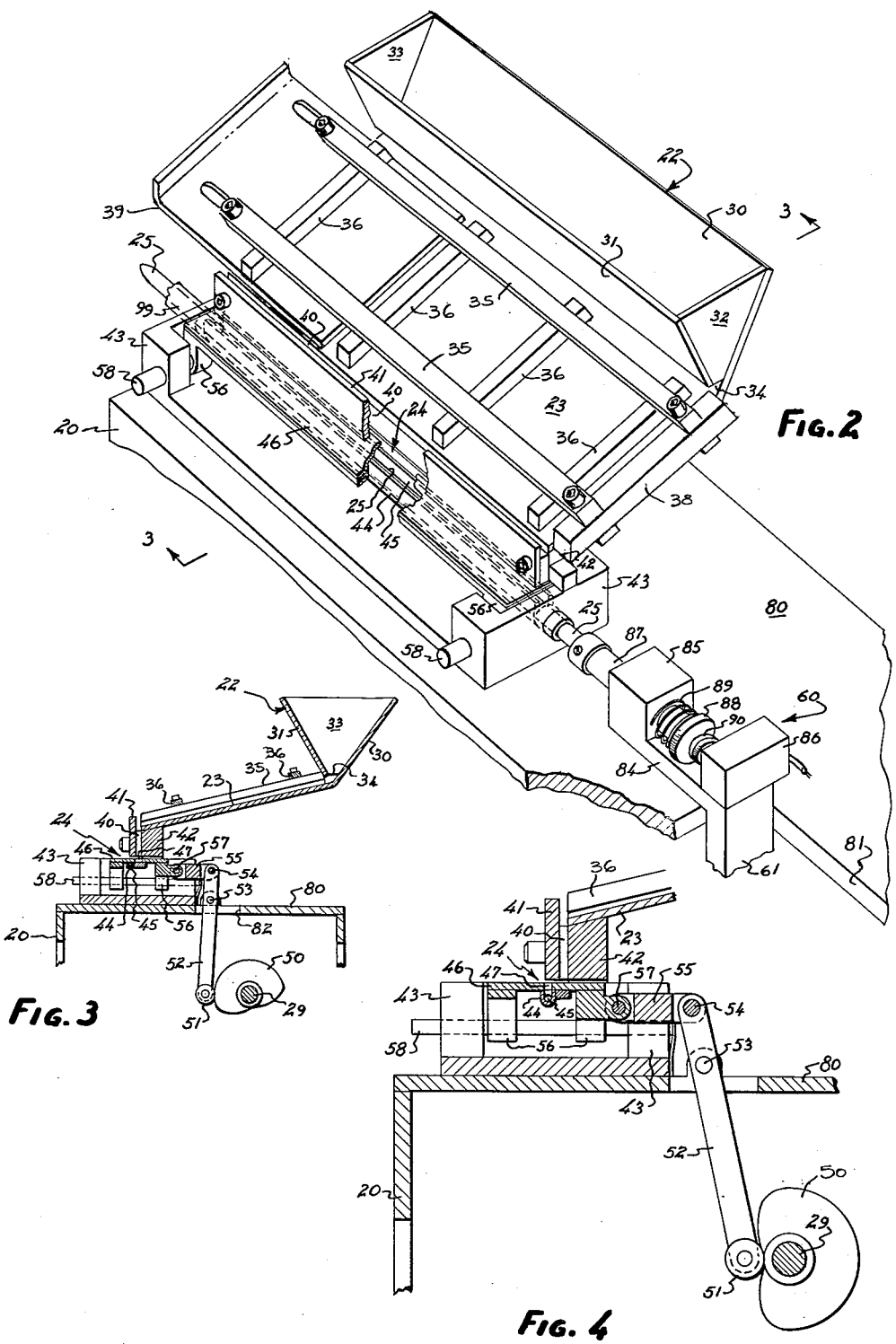

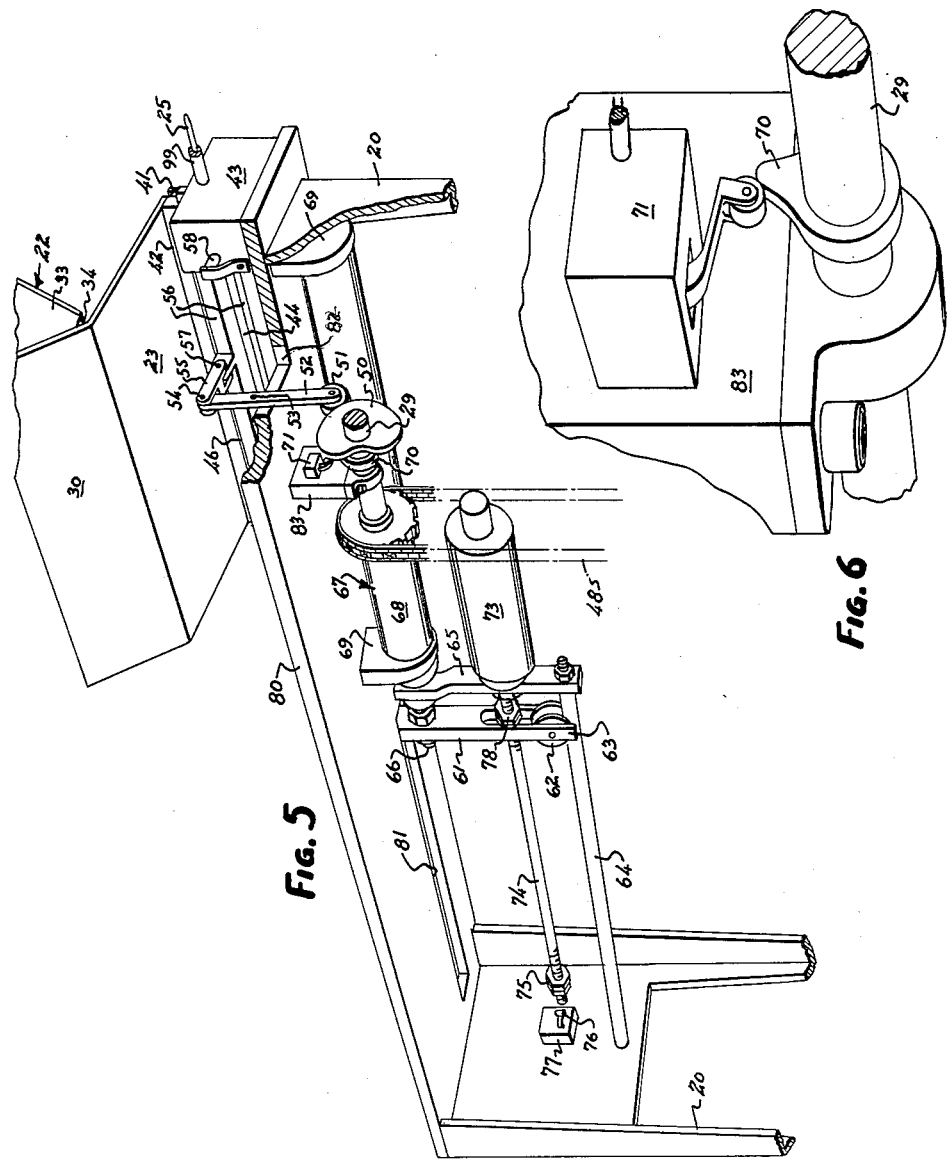

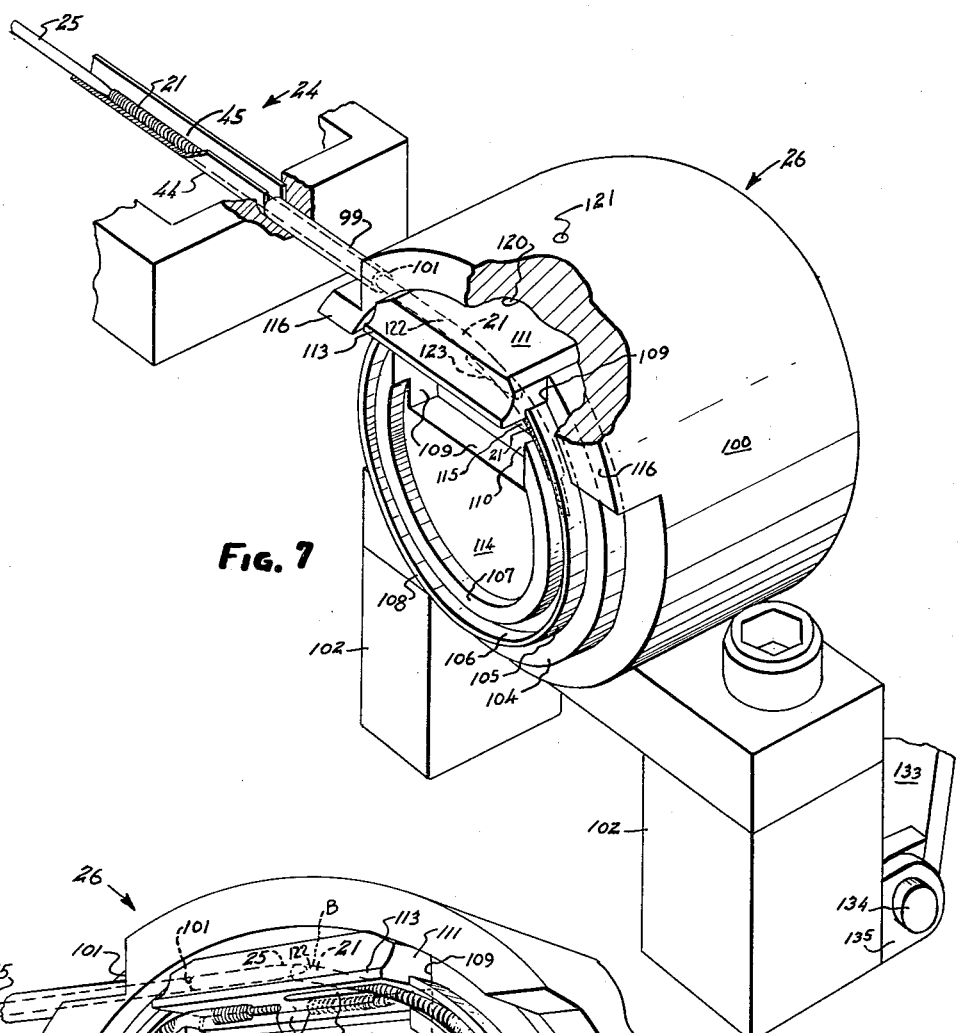
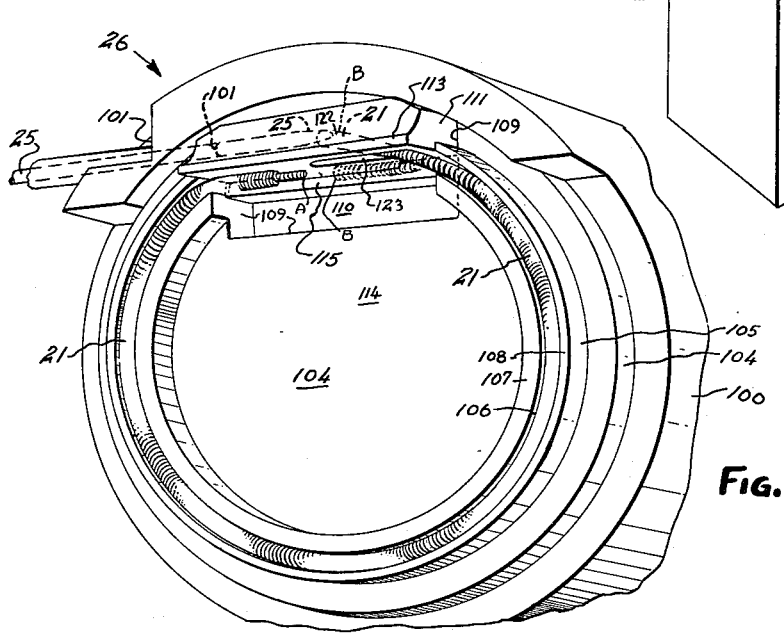

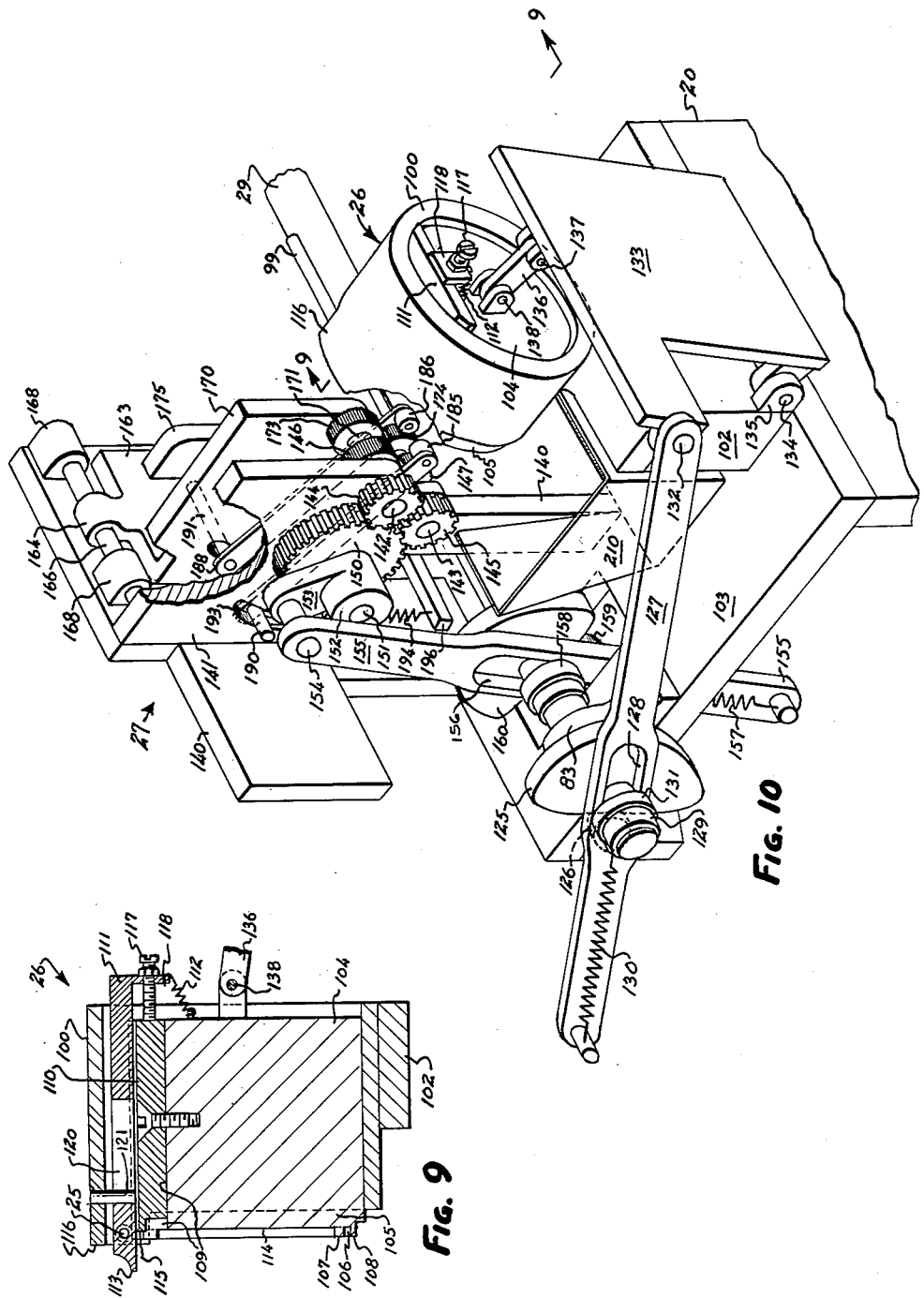

United States Patent Office 3,079,956
Patented Mar. 5, 1963

3,079,956
SPRING JOINING MACHINE
Harold A. Smith and Siegfried Konrad, St. Paul, Minn., and Richard J. Bagdon, Los Altos, Calif., assignors to Federal-Mogul-Bower Bearings, Inc., Detroit, Mich., a corporation of Michigan
Filed Feb. 16, 1959, Ser. No. 793,393
13 Claims. (Cl. 140—71)

This invention relates to a spring joining machine. More particularly it relates to a machine for joining the ends of a helical spring to form a circular loop spring of the type usually known as a garter spring.

Garter springs have many uses. For example, the oil seal industry employs garter springs to maintain an even distribution of gentle radially inward pressure on a shaft-engaging lip of an annular shaft seal. Garter springs are made by first winding spring wire into a helical coil spring and then joining together the ends of the helix. The first step, that of winding the helical spring is done very efficiently by apparatus such as that shown in U.S. Patent 2,857,149 to Harry J. McCullough, in which one end of the helix is formed to a smaller diameter than the other end, so that the smaller end may be inserted into the larger end and then locked there by giving either end a few twists. However, to join the ends together is not so simple as one might think. The difficulties are: first, to make the loop and join the ends entirely by machine; second, to maintain dimensional uniformity, so that every spring in a series has exactly the same circumference; and third, to lock the ends together without leaving a twisting moment on the spring. As to the third point, if the spring is joined by making a simple loop, inserting the smaller end in the larger end and then giving either end a few turns, there will be a twisting moment tending to turn the spring into a figure-8 instead of its remaining circular.

In the prior art this spring-joining operation has had to be done largely by hand, or by hand-controlled machines carefully watched by the operator. In this way the figure-8 tendency could be avoided by first giving the smaller end of the spring a few reverse turns before inserting it into the larger end and then giving the same number of forward turns after insertion. Heretofore, no automatic machine would perform this type of joining.

An object of the present invention is to provide a fully automatic spring-joining machine. In a machine of this invention, helical coil springs from a spring-making machine may be dumped into a hopper and issue at the other end of the machine as circular coil springs of exactly the desired circumference and without any tendency to twist into a figure-8. Thus, other objects of the invention are to provide a precision spring-joining machine that produces joined springs of exact circumference and to provide a spring-joining machine that locks the ends of springs together without imposing a twisting moment upon the springs.

Another object of the invention is to provide an extremely rapid and fool-proof spring-joining machine. Other objects and advantages of the invention will appear from the description of a preferred embodiment of the invention.

In the drawings:

FIG. 1 is a view in front elevation of a spring-joining machine embodying the principles of this invention, an alternative position of some elements being shown in broken lines.

FIG. 2 is a view in perspective of a portion of the machine of FIG. 1, looking from the right end of that view, and showing the arrangement for feeding in linear springs. A portion has been broken away to show some parts that are normally covered, and the ends and lower portions of the machine have been broken off.

FIG. 3 is a view in side elevation and in section of the machine portion of FIG. 2, showing the spring-feeding arrangement with its shuttle in one position.

FIG. 4 is a fragmentary view in side elevation and in section of a portion of FIG. 3 but on an enlarged scale and showing the shuttle in its other position.

FIG. 5 is a perspective looking from below of the feed-in portion of the machine with some parts broken away and others broken off.

FIG. 6 is a fragmentary view of the microswitch control of the feed mandrel.

FIG. 7 is a view in perspective, on an enlarged scale, of the spring-looping die by which the linear spring is guided into a generally circular shape, although its ends are not yet joined. Some adjacent machine parts are also shown, and some portions are broken away and others are broken off.

FIG. 8 is a view in perspective of the front end of the looping die, looking from below.

FIG. 9 is a reduced view in elevation and in section of the upper portion of the looping die taken along the line 9—9 in FIG. 10.

FIG. 10 is a view in perspective, on a smaller scale than FIG. 7 of the end-joining assembly and looping die, with other parts of the machine broken off.

FIG. 14 is a view like FIG. 13 of a portion thereof with the looping die in its advanced position.

FIG. 15 is a perspective view of the rear of the end-joining assembly of FIGS. 8 and 9 with some parts omitted and others broken off.

FIG. 16 is a circuit diagram of the electrical circuit used in the machine.

*General Operation and Layout*

Figure 11:
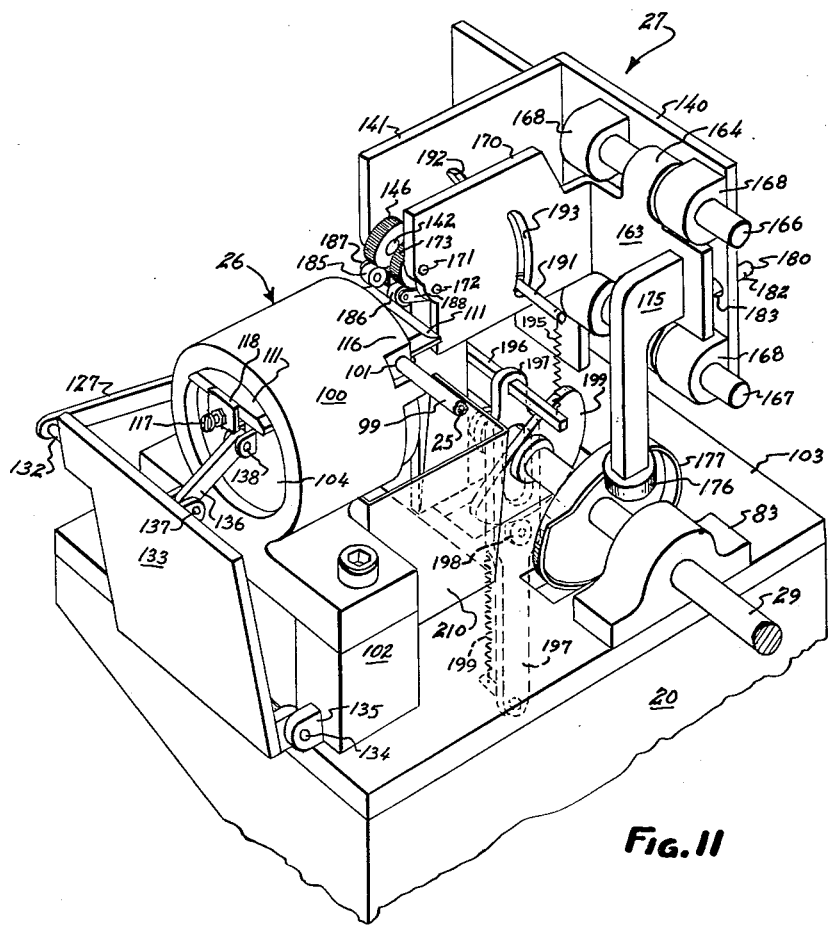
FIG. 11 is another perspective view of the assembly of FIG. 10 on a slightly smaller scale and looking from a different viewpoint.

As shown in the drawings, the spring-joining machine of this invention has a main supporting frame 20. Cut lengths of straight helical springs 21 are inserted into a hopper 22 and roll down a slide 23 into a feed-in assembly 24. A reciprocating rod or mandrel 25 propels the spring 21 from the assembly 24 into a looping die 26, thereby bringing the spring 21 into a circular shape. Thence, the spring 21 is delivered to an end-joining assembly 27, where its ends are secured together while maintaining its circular form. The basic movements, other than those controlled by gravity and the synchronization of the movements, are provided by a motor 28 through a cam shaft 29 whose cams will each be described at the proper place.

*The Hopper 22 and Slide 23 (FIGS. 1–3)*

The hopper 22 is shown supported by the slide 23 but it may, if desired, be supported directly by the frame 20. Basically, the hopper 22 comprises a pair of converging plates 30 and 31 and a pair of vertical end plates 32 and 33. The fact that the hopper 22 is much longer than it is wide facilitates getting the springs 21 aligned axially of the machine. The hopper 22 has an elongated narrow bottom outlet opening 34 through which the springs fall onto the slide 23.

The slide 23 is essentially an unencumbered inclined plate affording a free sliding surface. It may, as shown, be made integral with or welded to the hopper plate 30.

To keep the springs 21 from bouncing off the slide 23 or rolling off one of its end edges, a guide means may be provided. For example, there may be two axially extending guide bars 35 with a plurality of transverse guide bars 36 welded to their lower surface parallel to and spaced from the slide 23. The guide bars 35 are spring-loaded and connected to side guide members 38, and an adjustable end guide 39 is slidably mounted to one guide 38. The guides 38 and 39 serve to deflect any portion of the spring 21 that tends to extend beyond the ends of the slide 23, which is rare because of the aligning action of the hopper 22.

*The Feed-In Assembly 24 (FIGS. 1–5)*

The springs 21 roll down the slide 23 and fall off its lower end into a vertical slot 40, which is narrow, long, and deep. It lies between a front vertical guide plate 41 which helps deflect the spring 21 down into the slot 40, and a vertical frame member 42 that preferably supports the slide 23 and is itself supported by a pair of frame blocks 43. The blocks 43 also support a stationary feed receptable 44 that has a U-shaped recess or groove 45 extending axially thereof and spaced forward of and parallel to the slot 40.

Above the receptacle 44 is a reciprocating shuttle plate 46 with an axial through opening 47. The shuttle plate 46 slides back and forth over the receptacle 44 from a rear position (FIG. 3) where its opening 47 is exactly in line with the slot 40, to a forward position (FIG. 4) where its opening 47 is exactly in line with the groove 45. By this action, it takes one spring 21 at a time from the slot 40 and deposits it in the groove 45 and then covers that groove as it returns to get the next spring.

The action of the shuttle plate 46 and its timing are controlled by the camshaft 29. As shown in FIGS. 1 and 5, the motor 28 drives the camshaft 29 through a sprocket-engaging chain 48. A cam 50 mounted on the camshaft 29 controls the shuttle plate 46 through a cam follower 51. The follower 51 is rotatably mounted at one end of a lever 52 whose fulcrum 53 is secured to the frame 20. The opposite end of the lever 52 is pivoted by a pintle 54 to an arm 55 that is pivotally linked to two base portions 56 of the shuttle plate 46 by a shaft 57. The two base portions 56 of the shuttle 46 slide forward and back on stationary shafts 58 supported by the frame blocks 43.

*The Reciprocating Mandrel or Rod 25 (FIGS. 1–6)*

The mandrel or rod 25 reciprocates in the groove 45 to propel the spring 21, small-end forward, therealong and into the looping die 26. The mandrel 25 is supported and driven through a carriage 60, which has a vertical depending portion 61 (FIGS. 1 and 5) with a roller 62 rotatably mounted at its lower slotted end 63. The roller 62 gives a low-friction support to the carriage 60 by moving along over a guide rod 64 supported rigidly by the frame 20 at one end and by a bracket 65 at the other end. The vertical carriage portion 61 is secured to a piston rod 66 of a bellows air motor 67 that lies parallel to the camshaft 29. The cylinder 68 of the motor 67 supports the bracket 65 and is itself supported by frame-supported brackets 69.

A cam 70, mounted on the camshaft 29, is adapted at the proper time to trip a microswitch 71 that actuates, through a holding relay 72 or other well-known structures, the motor 67 to force out its piston rod 66 and thereby to retract the mandrel 25 along the groove 45 so that the groove 45 can receive a spring 21. The mandrel 25 is slowed down gradually at the end of its stroke instead of being jolted by a sudden stop. This may be done by a dashpot 73, such as a hydrocheck valve which is supported by the bracket 65 and has an actuating rod 74 that extends with clearance through the slotted lower end 63 of the carriage 60. An actuator nut 75 is adjustably mounted adjacent the outer end of the rod 74 for engagement by the carriage portion 61. Engagement of the nut 75 moves it against a lever 76 of a microswitch 77 and reverses the motor 67 to propel a spring 21 (which the shuttle 46 has meantime dropped into the groove 45) into the looping die 26. To insure exact placement of the spring 21 in the die 26, the mandrel 25 is again slowed down at the end of its inward stroke, this time by engagement of an adjustable actuator nut 78 on the rod 74. Thereby, the spring 21 stops at exactly the same place each stroke. (The nut 78 has been omitted from FIG. 5 to avoid obscuring the slotted end 63.)

The carriage 60 extends above the top of a frame-supported table 80 and reciprocates through a slot 81 in the table 80. The lever 52 extends through a slot 82 in the table 80. The shaft 29 is supported below the table 80 by bearing-brackets 83. In general, only the parts that actually act directly on the spring 21 extend above the table 80, the other operating mechanism all being below the table 80 where it is less dangerous to workmen and where it may be enclosed in a suitable housing (not shown).

The upper end 84 of the carriage 60 is bifurcated to provide a forward portion 85 spaced from a rear portion 86. A sleeve 87 in the forward portion 85 guides and aligns the mandrel 25, which extends through the portion 85 and terminates in an enlarged end 88. A spring 89 is compressed between the portion 85 and the enlarged end 88 of the mandrel 25. The rear portion 86 supports a microswitch lever 90 opposite and normally spaced from the mandrel end 88. However, if the mandrel 25 strikes any obstruction as it moves to the left in FIG. 1, its resulting rearward movement will overcome the pressure of the spring 89 and urge the lever 90 to activate its microswitch 91 to reverse the air motor 67 and retract the mandrel 25.

Figure 13:
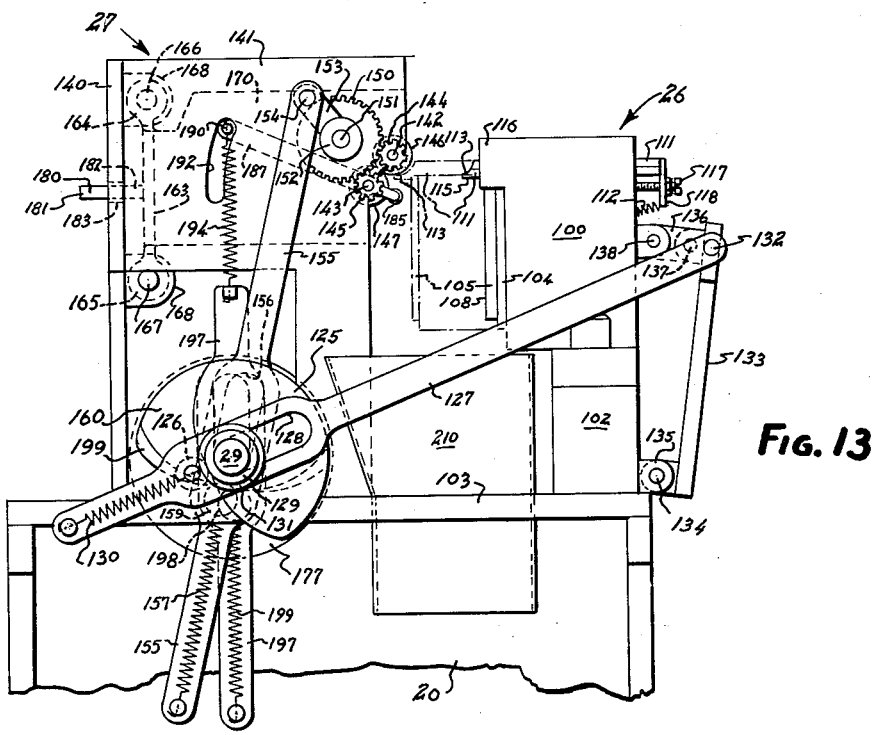
FIG. 13 is an end elevation view of the end-joining assembly, with the looping die in its retracted position.

*The Looping Die 26 (FIGS. 1, 7, 11 and 13)*

The receptacle 4 with the groove 45 is continuous with a tube 99 which leads from the feed-in assembly 24 to the die 26. There it is connected to a cylinder or housing 100 at the latter's inlet passage 101. The cylinder 100 is stationary and is fastened to the frame 20 by means of a block 102 that rests on a table 103 that is lower than the table 80 and, in fact, lower than the shaft 29. Inside the cylinder 100 a piston 104 is mounted for reciprocating motion. To one end of the piston 104 is secured a block 105 with an annular segment channel 106 (FIG. 7) lying between projecting walls 107 and 108.

The piston 104 is provided with a rectangular axially extending groove 109 at its upper end, and a block 110 is mounted therein in fixed relation to the piston. A second block 111 is mounted in the groove 109 above the block 110 and in slidable relation to the block 110 and piston 104, with a spring 112 normally urging it for movement with them. The block 111 has a projecting lip 113 with a curved upper surface. The block 110 also projects beyond the face 114 of the piston 104 and beyond the bottom of the channel 106 and has a flat end surface 115 which, like a chord, extends between the ends of the channel 106. The periphery of the channel 106 is also continued by an arcuate hood 116 that is part of the cylinder 100. The position of the block 111 may be adjusted by a screw 117 that threads into a bracket 118 attached to the rear of the block 111 and bears against the rear end of the piston 104. A keyway 120 and stop 121 (FIG. 9) limit relative movement of the block 111 and piston 104.

A passage 122 extends through the block 111 and leads from the inlet passage 101 to an outlet 123 in the lower surface of the block 111. Thence, the inner surface of the hood 116 guides the spring 21 into the channel 106. The mandrel 25 pushes the spring 21, small end forward, all the way around the channel 106 and out therefrom over the flat end surface 115 beneath the projecting lip 113. The mandrel 25 stops its stroke at the outlet 123; so the trailing or larger end of the spring 21 falls down onto the surface 115 a short distance away from the leading or smaller end and on the same level. The channel block 105 determines the length of the spring beween ends, and it is the only part needing replacement when the spring length is changed. All other parts operate the same as before, and the channel block 105 is accurately made to define exactly the correct length.

The piston 104 and blocks 105, 110 and 111 are reciprocatingly driven by the camshaft 29 through a cam 125. A cam follower 126 is mounted on a lever arm 127 which has a slot 128. The camshaft 29 engages the interior of the slot 128 and guides the lever arm 127, an enlarged nut 129 holding the lever arm 127 on the shaft 29. Cam following is assured by a spring 130 anchored at one end to the arm 127 and at the other end to a bearing sleeve 131 that surrounds the shaft 29. The lever arm 127 is pivoted by a pintle 132 to the upper end of a plate 133 that is pivotally mounted on a shaft 134 at its lower end. The shaft 134 is retained by lugs 135 on the block 102. A link 136 is attached by a pivot 137 to the plate 133 and by a pivot 138 to the piston 104. Thus rotation of the shaft 29 rocks the arm 127 and reciprocates the piston 104. The blocks 105 and 110 always move with the piston 104, and so does the block 111 until it engages something and then its spring 112 yields. The purpose of this movement is to transfer the spring 21 from the looping die 26 to the end-joining assembly 27, and the actual transfer will be explained after first describing the assembly 27.

Figure 12:
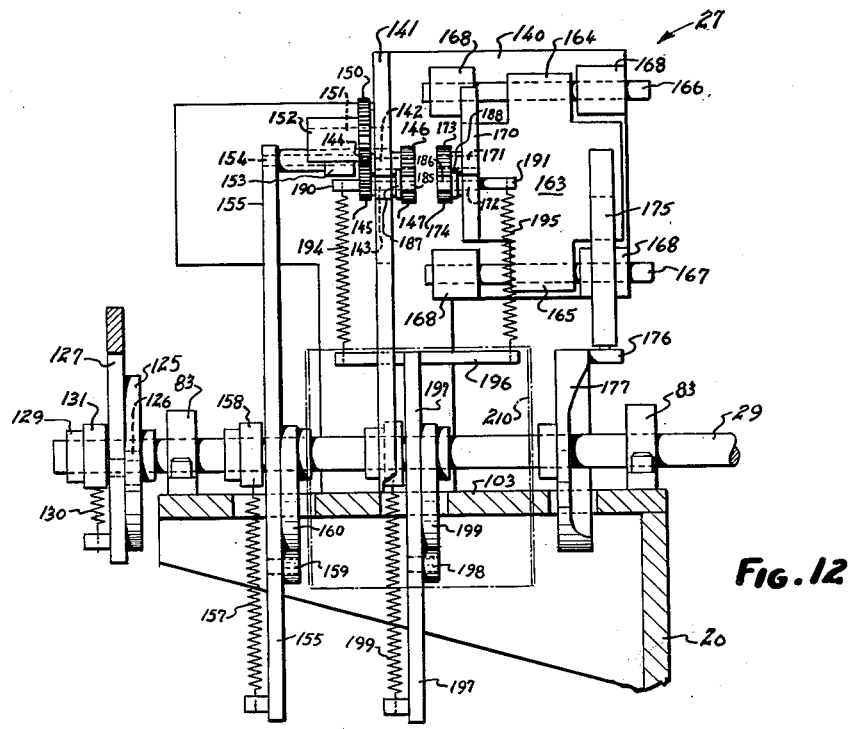
FIG. 12 is a view in front elevation and in section of the end-joining assembly and a portion of the camshaft and related parts.

*The End-Joining Assembly 27 (FIGS. 1 and 10–15)*

The springs 21 are oriented so that the small end A leads, and the large end B trails. The end-joining assembly 27 gives the large end B a predetermined number of reverse turns while the spring-ends are apart, then moves the small end A toward and into the large end B, and then gives the large end B the same number of forward turns to lock the spring ends together without leaving a twisting moment.

The parts that control the large end B are mounted to the frame 20 by a rigid rear frame member 140 and a rigid side plate 141, both extending up from the table 103. In the side plate 141 are journaled a pair of short shafts 142 and 143. On the left side of the plate 141, as viewed from the front (i.e., FIGS. 1 and 12) spur gears 144 and 145 are mounted respectively on the shafts 142 and 143. On the right side of the plate 141, the shafts 142 and 143 carry respective knurled rollers 146 and 147 which therefore rotate with their respective gears 144 and 145.

The spur gears 144, 145 are both rotated simultaneously by a pinion gear 150 whose shaft 151 is also rotatably supported by the plate 141. The gear 150 has a collar 152 to which a crank arm 153 is rigidly mounted. A crank pin 154 connects the crank arm 153 to a lever arm 155 that is substantially like the lever arm 127, having a slot 156 that rides the shaft 29, and a spring 157 is attached to both the lever 155 and a collar 158 to keep a follower 159 riding on a cam 160. The cam 160 reciprocates the lever 155 to move the crank 153 down at one point in the cycle and up at another point. Obviously, this effects rotation of the knurled rollers 146, 147 first in one direction and then in the opposite direction— both for exactly the same amplitude.

The parts that control the small end A of the spring 21 are mounted on a movable carriage 163. The carriage 163 has brackets 164 and 165 attached respectively to upper and lower shafts 166 and 167 that reciprocate in bearings 168 secured to the stationary rear frame member 140. The bearings 168 are spaced and the brackets 164 and 165 are sized to limit the stroke of the carriage 163 to a predetermined magnitude. The carriage 163 has a plate 170 that lies parallel to the plate 141 and is moved toward and away from it by movement of the carriage 163. The plate 170 rigidly supports a pair of stub shafts 171, 172 that carry non-rotatable knurled rollers 173, 174.

A depending arm 175 of the carriage 163 has a follower 176 that engages a cam 177 mounted on the camshaft 29 and with its cam surface varying axially rather than radially. That the follower 176 will follow the cam 177 is assured by a spring 180, one end of which is secured to a pin 181 rigidly attached to the stationary frame member 140, the other end being secured to a pin 182 on the carriage 163 and projecting through a slot 183 in the plate 140. Thus, rotation of the shaft 29 causes the plate 170 to move toward the plate 141 at one part of the cycle and away from it at another part.

The respective spring ends are grasped by the knurled rollers 146, 147 and 173, 174, and by a pair of third rollers 185, 186. The rollers 185, 186 are mounted rotatably at the ends of respective arms 187, 188 which are secured to respective shafts 190, 191. The shafts 190, 191 extend out through arcuate slots 192, 193 in the plates 141 and 170 and are connected by springs 194, 195 to a bar 196. The bar 196 is attached to a slotted lever arm 197 like the levers 127 and 155 and like them is slotted and has a follower 198 spring urged against a cam 199. The springs 194, 195 in combination with the cam 199 act like a trigger to move the rollers 185, 186 in toward the knurled rollers at the proper time to grasp the spring ends and move them away later to release the spring 21.

*The Electrical Circuit (FIG. 16)*

An across-the-line diagram, FIG. 16, shows the simple electrical circuit. Any suitable power source may be used. That illustrated is 110 volt A.C. An on-off switch 200 controls the circuit. A line 201 runs to the motor 28.

The relay 72 in series with the normally-open switch 71 and with a parallel circuit including normally open holding contacts 202 and normally closed switches 77 and 91. The relay 72 controls three sets of contacts, the holding contacts 202, and contacts 203 and 204. The contacts 203 are normally open and are in series with a solenoid 205 of the air motor 67. When the relay 72 is energized, contacts 203 are closed and the solenoid 205 is energized to move the mandrel 25 in. The contacts 204 are normally closed and are in series with a solenoid 206 of the air motor 67 that moves the mandrel 25 out when the relay 72 is de-energized. Energization of the relay 72 opens the contacts 204 and de-energizes the solenoid 206.

Thus, the relay 72 is normally energized by the cam 70 closing the switch 71. When energized, the relay 72 closes the contacts 202 and 203 and opens the contacts 204. The relay 72 remains energized until either of the switches 77 or 91 are opened. The switch 77 is opened at the end of the mandrel's stroke, and the switch 91 is opened if the mandrel's forward progress is stopped suddenly in some manner.

*Operation*

While the operation is apparent from the preceding description of the various stages, its review may be helpful. The machine is synchronized by the single motor 28 rotating the camshaft 29 and by the arrangement of the cams mounted thereon. Every operation in the cycle is controlled positively by these cams, whether they act directly on mechanical levers or indirectly by tripping electrical switches. However, obviously other controls can be used where desired.

The straight springs 21 are poured into the hopper 22 with their small ends A headed downstream of the device. They fall down and become aligned by the hopper 22 and leave it through the bottom opening 34. They roll down the slide 23 and fall into the slot 40 and onto the shuttle plate 46. From then on, cam-controlled apparatus takes over. The reciprocating shuttle 46, moved and timed by its cam 50 and associated levers, etc., picks up one spring each trip in its opening 47 and carries it to and drops it in the groove 45.

The mandrel 25 has meanwhile been moving back out of the groove 45 and does not interfere with the newly received spring 21. A moment after the spring 21 has fallen into the groove 45, the rearward movement of the mandrel carriage 60 engages the dash-pot nut 75, and the mandrel 25 is slowed to a stop, meanwhile actuating the microswitch 77. Actuation of the microswitch 77 energizes the bellows motor 67 to send the mandrel 25 forward, and it propels the spring 21 along the groove 45 into the looping die 26. The mandrel 25 ends its stroke just after pushing the larger end B of the spring through the outlet 123. Shortly before, its carriage 60 has engaged the nut 78 and the dashpot 73 slows it to a stop at exactly the same position each cycle. The cam 70 then actuates the microswitch 71 and returns the mandrel 25.

The spring 21 has been formed into a loop by the channel 106, and its ends rest on the block 110 just below the block 111. At this time the cam 177 holds the carriage 163 apart from the plate 141, and the cam 199 holds the rollers 185, 186 down away from the rollers 146, 147, 173 and 174.

The rotation of the cam 125 now acts to force the piston 104 forward in its cylinder 100, and the blocks 110 and 111 move with it and carry the looped spring 21 toward the rollers 146, 147, 173 and 174. When the lip 113 of the block 111 engages the rollers 146 and 147, its spring 112 yields, and it stays stationary while the block 110 carries the spring ends into the space between the knurled rollers 146, 147, 173 and 174. Just as the spring 21 is carried to its innermost position, the case 199 acts through its springs and levers to snap the small rollers 185, 186 up toward the rollers 146, 147, 173 and 174, and the spring ends are then held by the two sets of three rollers each. As the case 125 causes retraction of the piston 104 and blocks 110 and 111, the rollers 146, 147, 173, 174, 185 and 186 hold on to the spring ends and strip the looped portion from the channel 106.

The cam 160 then acts to move the crank 153 up, thereby rotating the gears 150, 144 and 145, and through them the knurled rollers 146 and 147, to rotate only the large end B of the spring 21 through a predetermined angle. Next, the cam 177 causes the carriage 163 to move toward the plate 141, carrying the small spring end A (held by the rollers 173, 174, and 186) toward and into the large spring end B, held by the rollers 146, 147 and 185. Then the cam 160 moves the crank 153 down, reversing the rotation of the knurled rollers 146 and 147 and rotating the large end B of the spring 21 the same amount as before, but in the opposite direction, so as to lock the spring ends A and B together without imposing a twisting moment. This locks the spring into a closed circle or garter and completes the product. Finally, the cam 199 causes the rollers 185, 186 to move down, and the completed spring drops into an outlet hopper or chute 210 and the cam 175 moves the carriage 163 back where it is ready for the next spring.

To those skilled in the art to which this invention relates, many additional changes in construction and widely differing embodiments of the invention will suggest themselves without departing from the spirit and scope of the invention as defined in the claims. For example, instead of the mandrel being driven by pneumatic or hydraulic cylinders and actuated by cams on the cam shaft 29, the mandrel may be driven back and forth by a chain looped around a pair of sprockets with one sprocket being driven by beveled cams from the motor drive shaft or from the cam shaft 29. In this event, the mandrel moves directly with the chain and necessarily slows down at each end of the stroke when the chain rounds the sprocket. Hence, no damping means such as the hydro-check valve is needed. This is but one example of another means that may be employed in this invention and referred to in the claims under such terminology as "actuating means."

What is claimed is:

1. A machine for securing together the ends of a straight helical spring having a larger end and a smaller end, said machine including in combination: a looping die having a generally circular arcuate planar channel open on one side and at each end; means for loading a straight spring into said channel with the ends of the spring extending beyond the ends of said channel and spaced apart from each other; means for seizing said spring adjacent each end and stripping it from said channel and holding said spring only at said ends; means for positively rotating one end of said spring a predetermined amount in a predetermined direction while said spring ends are spaced apart; means for then moving the smaller end of said spring into the larger end; and means for then positively rotating the previously rotated spring end exactly the same predetermined amount in the opposite direction to lock said spring ends together without a twisting moment.

2. The machine of claim 1 wherein said means for loading comprises a reciprocating mandrel and a receptacle having a groove in which said mandrel reciprocates and drives a spring therealong.

3. A machine for securing together the ends of a straight helical spring having a larger end and a smaller end, said machine including in combination: a motor driven shaft; first, second, third and fourth actuating means operated by said shaft; a looping die having a generally circular arcuate planar channel open on one side and at each end; means actuated by said first actuating means for loading a straight spring into said channel with the ends of the spring extending beyond the ends of said channel and spaced apart from each other; means actuated by said second actuating means for seizing said spring adjacent each end and stripping it from said channel, so that said spring is then held only at its ends; means activated by said third actuating means for rotating one end of said spring a predetermined amount in a predetermined direction while said spring ends are spaced apart; means actuated by said fourth actuating means for then moving the smaller end of said spring into the larger end; and means actuated by said third actuating means for then rotating the previously rotated spring end the same predetermined amount in the opposite direction to lock said spring ends together without a twisting moment.

4. A machine for securing together the ends of a straight helical spring having a larger end and a smaller end, said machine including in combination: a motor driven shaft; first, second, third and fourth cam means operated by said shaft; a looping die having a generally circular arcuate planar channel open on one side and at each end; means actuated by said first cam means for loading a straight spring into said channel with the ends of the spring extending beyond the ends of said channel and spaced apart from each other; means actuated by said second cam means for seizing said spring adjacent each end and stripping it from said channel, so that said spring is held only at its ends; means activated by said third cam means for rotating one end of said spring a predetermined amount in a predetermined direction while said spring ends are spaced apart; means activated by said fourth cam means for then moving the smaller end of said spring into the larger end; and means activated by said third cam means for then rotating the previously rotated spring end the same predetermined amount in the opposite direction to lock said spring ends together without a twisting moment.

5. A machine for shaping, into a closed loop, a straight helical spring having a larger end and a smaller end, comprising; a looping die having a generally circular arcuate planar channel open on one side and at each end; means for reciprocating said die in a direction normal to the plane of said channel between an advanced position and a retracted position; feeding means substantially in the plane of said channel when said die is in its retracted position for sending a straight spring into said channel with the ends of the spring extending beyond the ends of said channel and apart from each other; end-holding means for seizing said spring adjacent each end when said die is in its advanced position and holding the said spring ends when said die is retracted so as to strip said spring from said channel, said end-holding means then being the only means holding said spring; means for rotating one said end-holding means and its end of the spring a predetermined amount in a predetermined direction while said spring ends are spaced apart; means for subsequently moving one of said end-holding means toward the other one to move the smaller end of said spring into the larger end; means for subsequently rotating the previously rotated end-holding means the same predetermined amount in the opposite direction to lock said spring ends together without a twisting moment; and means for subsequently releasing said spring from said end-holding means.

6. The machine of claim 5 wherein said end holding means comprise: an axially reciprocating carriage carrying a first pair of knurled wheels and a first spring-loaded roller normally urged away from said wheels; a stationary frame member; a second pair of knurled wheels rotatably mounted on said frame member; a second spring mounted roller normally urged away from said second wheels; and means for closing said rollers against their said wheels; the aforesaid end-holding means that are rotated the predetermined amount being said second wheels; the aforesaid means for moving one of said end-holding means comprising means for moving said carriage toward said second wheels.

7. A machine for shaping a straight helical spring into a closed loop, said spring having a larger end and a smaller end, said machine including in combination: a looping die having a circular arcuate planar channel open on one side and at each end; a series of cams; cam operating means; cam-operated means for reciprocating said die in a direction generally perpendicular to the plane of said channel between an advanced position and a retracted position; cam-operated means substantially in the plane of said channel when said die is in its retracted position for sending a straight spring into said channel with the ends of the spring extending beyond the ends of said channel and spaced well apart from each other; cam-operated end-holding means cam actuated for seizing said spring adjacent each end when said die is in its advanced position and holding the said spring ends free of all other means when said die is retracted so as to strip said spring from said channel; cam-operated means for rotating one said end-holding means a predetermined amount in a predetermined direction while said spring ends are spaced apart; cam-operated means for then moving one of said end-holding means toward the other one to move the smaller end of said spring into the larger end; cam-operated means for then rotating the previously rotated end-holding means the same predetermined amount in the opposite direction to lock said spring ends together without a twisting moment; and cam-operated means for releasing said end-holding means from the spring.

8. A machine for shaping a straight helical spring into a closed loop, said spring having a larger end and a smaller end, said machine including in combination: a looping die having a circular arcuate planar channel open on one side and at each end; a series of actuators; synchronizing means for said actuators; actuator operated means for reciprocating said die in a direction generally perpendicular to the plane of said channel between an advanced position and a retracted position; actuator-operated means substantially in the plane of said channel when said die is in its retracted position for sending a straight spring into said channel with the ends of the spring extending beyond the ends of said channel and spaced well apart from each other; end-holding means actuated by a said actuator for seizing said spring adjacent each end when said die is in its advanced position and holding the said spring ends when said die is retracted so as to strip said spring from said channel and provide the sole support for said spring; actuator-operated means for rotating one said end-holding means a predetermined amount in a predetermined direction while said spring ends are spaced apart; actuator-operated means for then moving one of said end-holding means toward the other one to move the smaller end of said spring into the larger end; actuator-operated means for then rotating the previously rotated end-holding means the same predetermined amount in the opposite direction to lock said spring ends together without a twisting moment; and actuator-operated means for releasing said end-holding means from the spring.

9. A machine for twist-joining a larger end to a smaller end of a helical spring to make a closed loop free from twisting moments, including in combination: a receptacle having an extended longitudinal groove; a mandrel reciprocating in said groove to move a said helical spring therealong and therebeyond; a looping die connected to said receptacle and having a channel describing a circular arc of more than a semi-circle and less than a full circle, and inlet means to said channel connected to said groove, said mandrel extending just short of said channel at the end of its stroke, both ends of said spring then lying beyond the ends of said channel; means for reciprocating said die transverse to the direction of the mandrel to advance and retract said die, said mandrel making its stroke when said die is retracted; means for seizing said spring adjacent each end and stripping it from said channel when said die is in its advanced position and holding said spring by itself; means for rotating one end of said spring a predetermined amount in a predetermined direction while said spring ends are spaced apart; means for then moving the smaller end of said spring into the larger end; and means for then rotating the previously rotated spring end the same predetermined amount in the opposite direction to lock said spring ends together without a twisting moment.

10. A machine for twist-joining a larger end to a smaller end of a helical spring to make a closed loop free from twisting moments, including in combination: a receptacle having an extended longitudinal groove; a mandrel reciprocating in said groove to move a said helical spring therealong and therebeyond; a looping die connected to said receptacle in a retracted position and having a channel describing a circular arc of more than a semi-circle and less than a full circle and inlet means to said channel connected to said groove, said mandrel extending just short of said channel at the end of its stroke, both ends of said spring then lying beyond the ends of said channel; means for reciprocating said die transverse to the direction of the mandrel to advance and retract said die; an axially reciprocating carriage carrying a first pair of knurled wheels and a first spring-loaded roller; roller-control means urging said roller normally away from said wheels and at one point in its cycle, when said die is advanced, snapping said roller toward said knurled wheels to grab the small end of said spring between the wheels and the roller; a stationary frame carrying a second pair of knurled wheels and a second spring-loaded roller, said roller-control means normally urging said second roller away from said second wheels and closing said second roller toward said second wheels at the same time that it snaps said first roller toward said first wheels; means for rotating said second wheels in one direction after said rollers have closed against said wheels; means for then moving said carriage toward said second wheels; means for then rotating said second wheels in the opposite direction; means for then opening said rollers away from said wheels; and means for then moving said carriage away from said second wheels whereby the large end of the spring is given a few turns, said small end is moved thereinto, and then the large end is given the same number of turns in the reverse direction and the closed spring loop is released.

11. A machine for joining the ends of helical springs to make a closed loop, including in combination: means providing a receptacle along which said springs can move in a straight line; a mandrel reciprocating in said receptacle to move said helical spring along said receptacle and therebeyond; a looping die connected to said receptacle and having a first block with a channel threin describing a circular arc of more than a semi-circle and less than a full circle, and also having means for reciprocating said block transverse to the direction of the mandrel and a second block projecting beyond said first block and spring mounted thereto for movement therewith but yielding to pressure against itself, said die having an entrance opening extending through said second block to said channel, said mandrel extending just short of said channel at the end of its stroke to place both ends of said spring on said first block below said second block and in contact therewith; an axially reciprocating carriage carrying a first pair of knurled wheels and a first spring-loaded roller; cam means urging said roller normally away from said wheels and at one point in its cycle snapping said roller toward said wheels to grab the small end of said spring; a second pair of knurled wheels rotatably mounted; a second spring-mounted roller normally urged away from said wheels and having means for closing it against said second wheels; and means for rotating said second wheels in one direction after said rollers have closed against said wheels, then moving said carriage toward said second wheels, then rotating said second wheels in the opposite direction, then opening said rollers away from said wheels, and then moving said carriage away from said second wheels so as to give the large end of the spring a few turns, then move the small end thereinto, then give the large end the same turn in the reverse direction and then to release the closed spring.

12. The machine of claim 11 wherein said last mentioned means comprises: a motor driven shaft having a series of cams mounted thereupon, said cams being arranged on said shaft so as to perform said operations in the sequence indicated in claim 11.

13. The machine of claim 12 wherein said last mentioned means also includes a pair of shafts on which said second wheels are mounted, a gear on each shaft, said gears being in engagement with each other; spur gear means for driving said gears and crank means actuated by one said cam for first driving said gears in one direction, and then after a time interval, driving them in the other direction.

References Cited in the file of this patent

UNITED STATES PATENTS

| | | |
|---|---|---|
| 689,578 | Dice | Dec. 24, 1901 |
| 1,079,075 | Truman et al. | Nov. 18, 1913 |
| 1,457,691 | Bull | June 5, 1923 |
| 2,400,319 | Tallion | May 14, 1946 |
| 2,641,051 | Vick | June 9, 1953 |
| 2,666,255 | McCoy et al. | Jan. 19, 1954 |
| 2,675,031 | Penny | Apr. 13, 1954 |
| 2,696,226 | Kane | Dec. 7, 1954 |
| 2,775,986 | Holroyd et al. | Jan. 1, 1957 |
| 2,949,136 | White | Aug. 16, 1960 |

FOREIGN PATENTS

| | | |
|---|---|---|
| 198,195 | Great Britain | May 31, 1923 |